United States Patent

Patterson

[15] 3,690,384
[45] Sept. 12, 1972

[54] COMBINED LAWN MOWER AND EDGER

[72] Inventor: Luther E. Patterson, 315 N. High St., Covington, Ohio 45318

[22] Filed: Nov. 3, 1971

[21] Appl. No.: 195,118

[52] U.S. Cl. .................172/15, 56/13.7, 56/17.4, 56/256
[51] Int. Cl. .............................................A01b 45/00
[58] Field of Search............56/11.6, 13.6, 13.7, 16.9, 56/17.1, 10.8, 11.5, 17.4; 172/13–18

[56] References Cited

UNITED STATES PATENTS

| | | | |
|---|---|---|---|
| 2,724,230 | 11/1955 | Burmeister | 56/17.4 |
| 2,737,105 | 3/1956 | Wilson | 172/15 |
| 2,908,127 | 10/1959 | Craig | 56/13.7 |
| 3,192,693 | 7/1965 | Bergeson | 56/13.7 |
| 3,338,314 | 8/1967 | Meltzer | 172/15 |
| 3,559,742 | 2/1971 | Rogillio, Sr. | 172/15 |

FOREIGN PATENTS OR APPLICATIONS

| | | | |
|---|---|---|---|
| 230,376 | 10/1959 | Australia | 56/16.9 |

Primary Examiner—Russell R. Kinsey
Attorney—John W. Melville et al.

[57] ABSTRACT

A combined lawn mower and edger, the edger providing means for edging or trimming along driveways, walks, curbs, flower beds, trees and the like, and being readily attached to or detached from a lawn mower. The edger blade assembly of the edger is secured to one end of an edger shaft rearwardly and laterally of the wheeled carriage of the lawn mower and arranged to rotate at all times in a substantially vertical plane clear of the ground when all wheels of the carriage are in contact with the ground and the edger is in a normally non-edging position spaced from the soil. The edger blade assembly is lowered, guided and raised, as desired, from a normally non-edging position, wherein the edger blade assembly is spaced from the soil, to an edging position, wherein the edger blade assembly engages the soil, while the motor is in operation, by pivoting the carriage of the lawn mower on its rear wheels.

10 Claims, 12 Drawing Figures

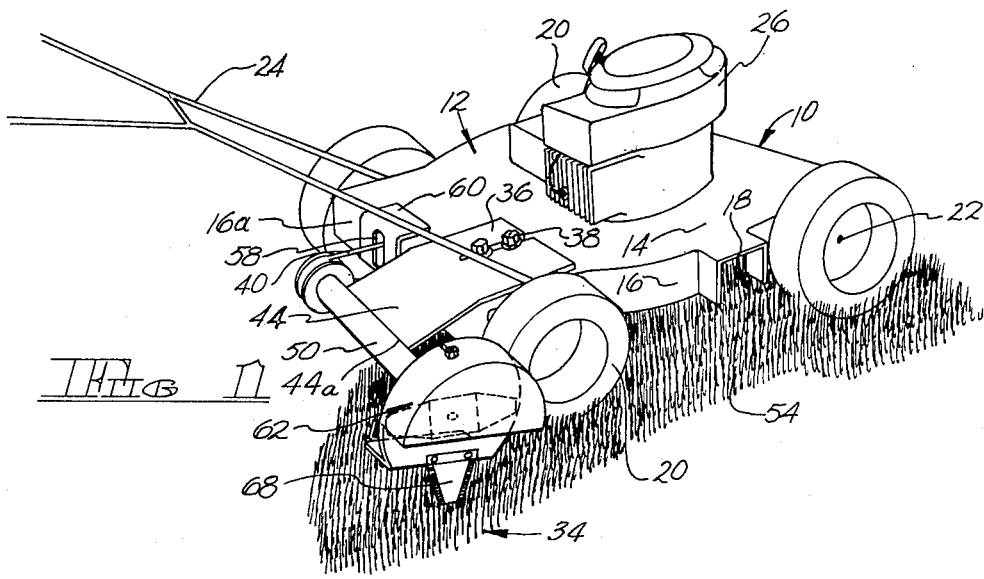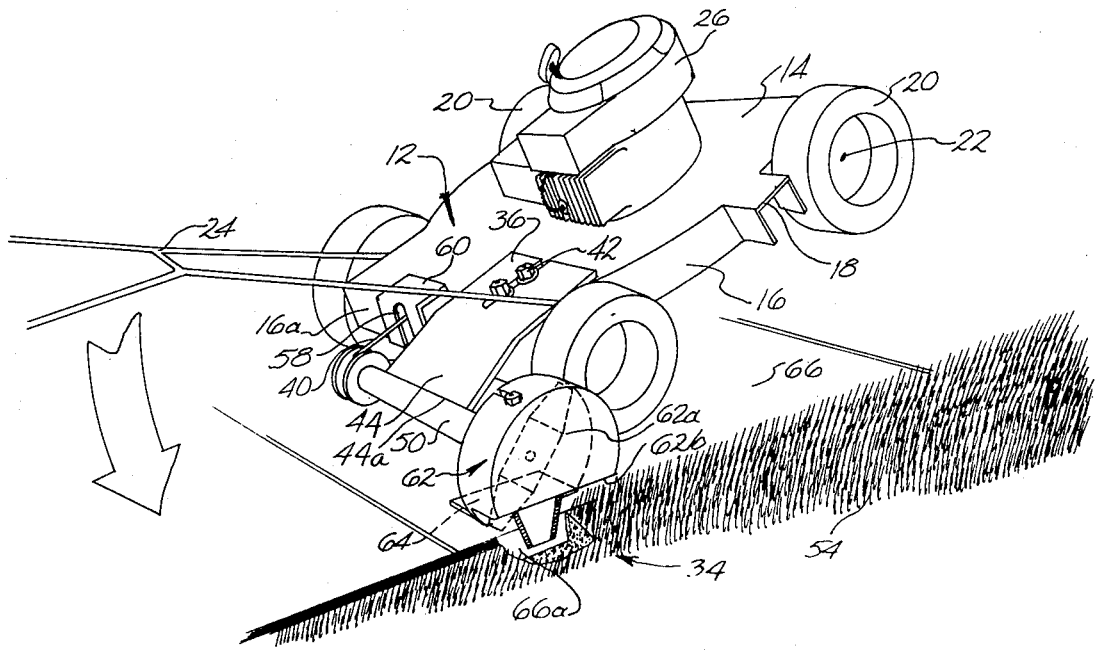

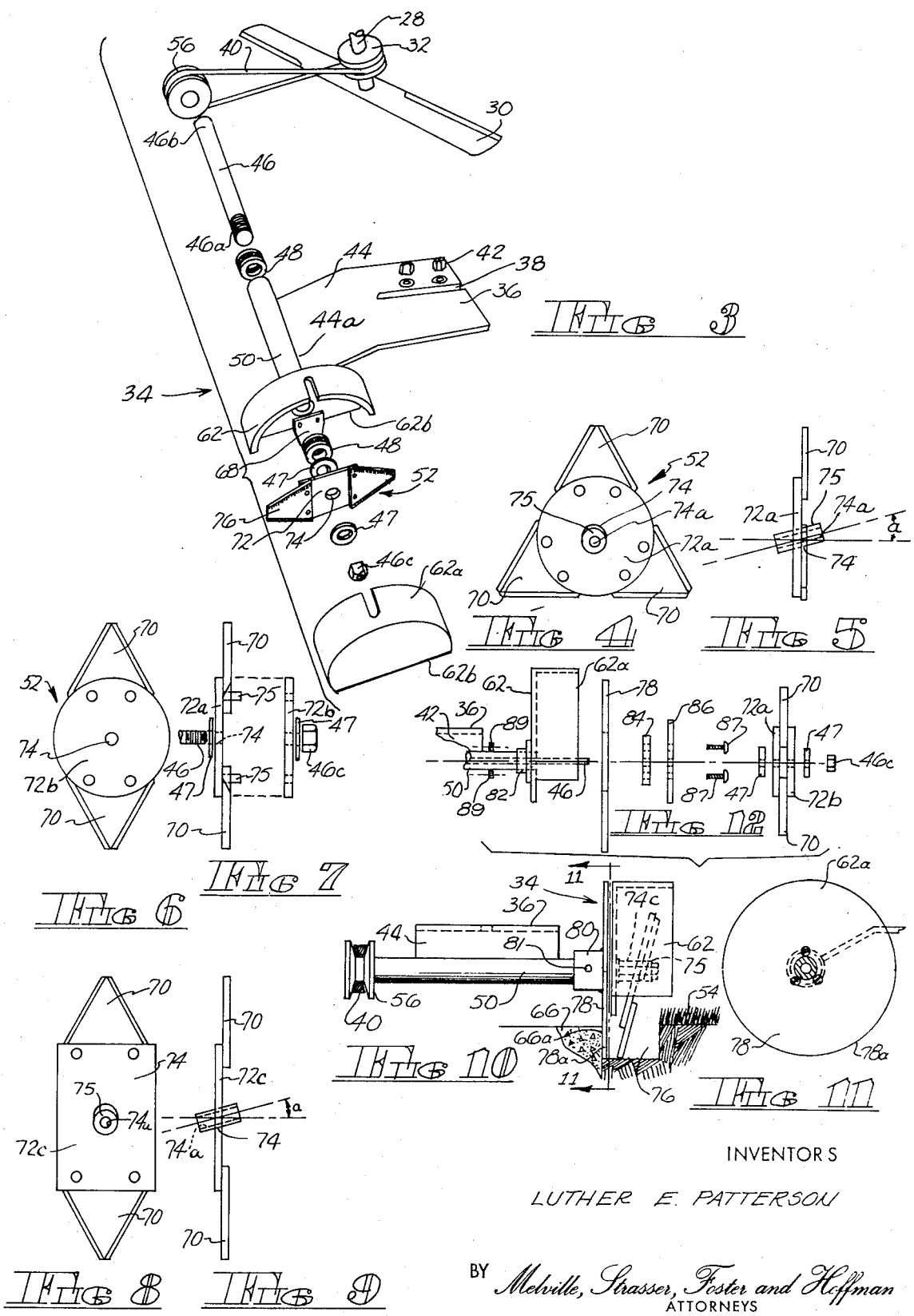

COMBINED LAWN MOWER AND EDGER

BACKGROUND OF THE INVENTION

1. Field of the Invention

This invention relates to lawn mowers, and more particularly to a combined lawn mover and edger, the edger being an attachment for the lawn mower and providing a means for edging or trimming along driveways, walks, curbs, flower beds, trees and the like.

2. Description of the Prior Art

Self-contained powered lawn edging devices, such as are disclosed in U. S. Pats. Nos. 3,193,996 (H. H. WELLBORN), 3,168,147 (B. M. PETERS), and 2,977,740 (G. E. KING), have long been in common use. However, the more satisfactory types of these self-contained powered lawn edging devices are quite expensive, often costing nearly as much as a powered lawn mower. Some attempts have been made to provide lawn edging apparatus at a reasonable cost by mounting such apparatus on a powered lawn mower so as to utilize the mower power source. However, such edging attachments have proven to be less than satisfactory because they have not exhibited relatively simple construction which is economical to manufacture, but which at the same time is rugged and durable and which offers easy control and the required desirable degree of maneuverability. Additionally, the prior art has been unable to develop an edging attachment which may be quickly and easily mountable and demountable on and off a lawn mower. Finally, such prior art attachments have always included complicated mechanical mechanisms for engaging and disengaging the edger blade with the soil. Examples of prior art edger attachments for power lawn mowers which have proven to be less than satisfactory include the lawn edger attachments disclosed in U. S. Pat. Nos. 3,304,700 (T. R. BARBER), 3,191,368 (F. C. HIDALGO), and 3,183,652 (J. T. PRATT).

SUMMARY OF THE INVENTION

Briefly, the present invention provides an improved edging apparatus which is readily and easily mounted on and demounted from most types of powered lawn mowers and which is driven in a simple effective manner from the lawn mower power mechanism. The edger attachment may be lowered, guided and raised, as desired, from a normally non-edging position, wherein the edger blade is spaced from the soil, to an edging position, wherein the edger blade engages the soil, by pivoting the carriage of the lawn mower on its rear wheels.

According to the present invention a mounting plate is adjustably secured to the substantially horizontal deck at the rear of the wheeled carriage of a lawn mover. A substantially horizontal, transversely extending, edger shaft is rotatably mounted on a downwardly extending leg portion of the mounting plate beyond the rear periphery of the carriage. An edger blade assembly having at least one edger blade is secured to one end of the edger shaft rearwardly and laterally of the carriage and arranged to rotate at all times in a substantially vertical plane clear of the ground when all wheels of the carriage are in contact with the ground and the edger is in a normally non-edging position spaced from the soil. The plane of rotation of the edger blade is disposed a distance laterally from the side of the carriage so as to clear a rear wheel of the carriage. Belt means connect a power take-off pulley on a vertical shaft from the motor with a pulley secured to the other end of the edger shaft. The edger shaft, and thus the edger blade, are lowered, guided and raised, as desired, from a normally non-edging position, wherein the edger blade is spaced from the soil, to an edging position, wherein the edger blade engages the soil, while the motor is in operation, by pivoting the carriage on its rear wheels.

BRIEF DESCRIPTION OF THE DRAWING

FIG. 1 is a perspective view of combined lawn mower and edger when the edger is in the normally non-engaging position spaced from the soil and all wheels of the carriage are in contact with the ground.

FIG. 2 is a perspective view similar to FIG. 1, showing the edger in an engaging position, wherein the edger blade engages the soil, by pivoting the carriage on its rear wheels.

FIG. 3 is an exploded view showing the edger and power take-off of the present invention.

FIG. 4 is an enlarged front elevational view of an edger blade comprising a plurality of wedge shaped mower sections secured on the peripheral edge of a plate.

FIG. 5 is a side elevational view of the edger blade of FIG. 4.

FIG. 6 is an enlarged front elevational view of an edger blade comprising two wedge shaped mower sections secured between two plates at the peripheral edges thereof.

FIG. 7 is an exploded side elevational view of the edger blade of FIG. 6, showing how the wedge shaped mower sections may be easily replaced.

FIG. 8 is an enlarged front elevational view of a further edger blade according to the present invention.

FIG. 9 is a side elevational view of the edger blade of FIG. 8.

FIG. 10 is a side elevational view of the edger according to the present invention, partially in section, showing a cutting disc rotatably secured on the sleeve adjacent the shield and arranged to rotate at all times against the edge of the adjacent payment, with the cutting edge thereof in the bottom of the trough formed by the edger blade.

FIG. 11 is a side elevational view of the edger shown in FIG. 10, as seen from the line 11—11.

FIG. 12 is a partial, exploded, side elevational view of the edger showing a cutting disc rotatably secured to the sleeve and positioned within the guard shield.

DETAILED DESCRIPTION OF PREFERRED EMBODIMENTS

Turning now to FIGS. 1 and 2, it will be seen that the power lawn mower 10 is of the conventional rotary type having a wheeled carriage 12 provided with a substantially horizontal deck or platform 14, formed of sheet steel, or the like, having its front edge turned down to provide a vertically disposed flange or skirt 16. The flange or skirt 16 is discontinuous for a portion of its length, thereby providing a discharge opening 18 for grass and other like cuttings. The carriage 12 includes the usual wheels 20 on opposite sides thereof which are suitably mounted on axles 22 adjustably fixed to the flange or skirt 16. The plane of the bottom of the wheels 20 is generally parallel to and spaced apart from the plane of the flange or skirt 16. Accordingly, the carriage 12 is movably supported. The usual or any suitable pushing and steering handle 24 is pivotally secured to the skirt 16 or deck 14, and extends rearwardly therefrom.

A source of power in the form of an internal combustion engine 26, or which may be an electric motor with a gear reduction, or the like, is mounted on the upper surface of the deck 14. A powered drive shaft 28 projects downwardly from the engine 26 or power source, through an opening in the central region of the deck 14. The usual elongated, rotatable blade 30 is carried at the lower end of the vertical drive shaft 28 and arranged to rotate at all times in a substantially horizontal plane. A power take-off pulley 32 is secured to the vertical shaft 28 at a point between the deck 14 and the rotatable blade 30.

As best seen in FIGS. 1 and 2, and in the exploded view of FIG. 3, the edger 34 of the present invention includes a mounting plate 36 adjustably secured to the deck 14 at the rear of the carriage 12. In a preferred embodiment, the mounting plate is provided with an appropriate slot 38 for adjustably securing the former in a desired position on the deck along the length of the slot 38, such that, as will be more fully explained hereinafter, the belt means 40 from the power take-off pulley 32 maintains the desired tightness. Bolts 42 or the like are provided on the deck 14 extending through the slot 38.

The mounting plate 36 includes a downwardly extending leg portion 44 extending outwardly beyond the rear periphery of the carriage 12. An edger shaft 46 is journaled in bearings 48 inside a sleeve 50 secured to the edge 44a of the leg portion 44 of the mounting plate 36. The sleeve 50, and thus the edger shaft 46, is substantially horizontal and transversely extending.

An edger blade assembly 52 having at least one edger blade 70 is secured to one end 46a of the edger shaft 46 rearwardly and laterally of the carriage 12 and arranged to rotate at all times, in a substantially vertical plane, clear of the ground when all wheels 20 of the carriage 12 are in contact with the ground and the edger 34 is in a normally non-edging position spaced from the soil, the plane of rotation of the edger blade 70 being disposed a distance laterally from the side of the carriage 12 so as to clear a rear wheel 20 of the carriage 12.

A pulley 56 is secured to the other end 46b of the edger shaft 46 and belt means 40 connecting the power take-off pulley 32 and the pulley 56 on the edger shaft 46 drive the edger shaft 46, and thus the edger blade 70.

In the preferred embodiment, the flange or skirt 16a on the rear of the carriage 12 is provided with an aperture 58 therein located in a line radially of the center of the deck 14, for passage of the belt means 40 connecting the power take-off pulley 32 and the pulley 56 on the edger shaft 46. A suitable reinforcing plate 60 may be secured around the aperture 58 so as to reinforce the flange or skirt 16a.

A guard shield 62 is secured on the sleeve 50 to enclose the edger blade assembly 52. The guard shield 62 is of preferably two piece construction such that one piece 62a thereof may be readily removed when it is desired to change edger blades 70.

The bottom edge 62b of the guard shield 62 is preferably formed such that it will be substantially parallel with the ground when the edger blade 70 is in engagement with the soil 54. A drag shoe 64 is secured substantially normal to the bottom edge of the guard shield 62 such that it is substantially contiguous with the surface of the pavement, driveway, or the like 66, immediately adjacent the edger blade 70 when the edger blade 70 is in engagement with the soil 54. The purpose of the drag shoe 64 is to move underneath matted grass which has grown over the pavement 66. This, of course, better enables the edger blade assembly 52 to cleanly edge the desired trough.

In a preferred embodiment the guard shield 62 is also provided with a depending wedge 68 which, as best seen in FIG. 2, is substantially contiguous with the edge 66a of the pavement 66 adjacent the edger blade assembly 52 when the edger blade 70 is in engagement with the soil 54.

Turning now to FIGS. 4 through 9, various edger blade assemblies 52 will be explained. In general, each edger blade assembly 52 comprises a plurality of wedge shaped cutting blades 70 secured on the peripheral edge of at least one supporting plate having a central aperture 74 therethrough, the plate being secured through the central aperture 74 to the edger shaft 46.

The edger blade assembly 52 of FIGS. 4 and 5, and 6 and 7, is provided with a circular support plate 72a. In FIGS. 4 and 5, the cutting blades 70 are spaced equally around the periphery of a single supporting plate 72a. Additionally, the central aperture 74 through the plate 72a has been provided with a sloping bearing 75 having an aperture 74a at an angle with the axis of the horizontal edger shaft 46. The purpose of the sloping bearing 75 will be more fully explained hereinafter in connection with FIG. 10. In FIGS. 6 and 7, the cutting blades 70 are oppositely disposed on the periphery of the support plate 72a. In the modification of FIGS. 8 and 9, the supporting plate 72c is rectangular and the cutting segments 70 are secured on opposite sides thereof. A sloping bearing 75 is also provided.

If it is desired that the edger blade assembly 52 provide an edged trough 76 of greater width, such as shown in FIG. 10, the central aperture 74 through the plate 72 may be provided with a sloping bearing 75 at an angle $a$ with the axis of the horizontal edger shaft 46 such that when the plate 72 is secured to the end 46a of the edger shaft 46 the edger blade 52 is inclined toward the carriage 12. It has been found that a desired angle is within the range of 10° to 15°.

In due course the wedge shaped cutting blades 70 will become dull through long use. This matter may be easily rectified through use of the edger blade 52 shown in FIGS. 6 and 7, wherein the individual cutting blades 70 are provided with apertures 71 which receive pins 75 on a plate 72a. A second plate 72b is then placed over the first plate 74 and this combination is then secured on the end 46a of the edger shaft 46 by way of a bolt 46c which is threadly received thereon. Suitable washers 47 can be provided on either side of the aperture 74 in the plates 72a and 72b.

In still another embodiment of the present invention, as shown in FIGS. 10 and 11, in lieu of the drag shoe 64 and the wedge 68 secured to the guard shield 62, a cutting and guide disk 78 is rotatably disposed adjacent a sleeve 80, which is secured to the sleeve 50 by suitable means, such as the key 81. The disk 78 is arranged to rotate at all times in a substantially vertical plane, so that when the edger blade 70 of the edger blade assembly 52 is in engagement with the soil 54, the cutting disk 78 rotates against the edge 66a of the adjacent pavement 66 with the cutting edge 78a thereof in the bottom of the trough 76 formed by the edger blade 70. It will, of course, be understood that the cutting and guide disk 78 shears the matted grass extending over the pavement and aids in properly aligning the edger blade 70 relative to the edge of the pavement 66 within the trough 76 and in the desired plane by when the cutting and guide disk 78 is held against the edge of the pavement 66.

FIG. 12 the cutting disc 78 is rotatably mounted around the edger shaft 46 within the guard shield 62, with the enlarged central opening of the cutting disc 78 receiving the bearing spacer 84 and suitable securing means, such as the bolts 87 and the nuts 89, securing the holding plate 86 and the bearing spacer 84 to the annular collar 82 on the sleeve 50.

In operation, as best seen in FIGS. 1 and 2, when it is desired to edge along driveways, walks, curbs, flowerbeds, trees and the like, the edger 34 of the present invention is adjustably secured to the lawn mower 10 by attaching the mounting plate 36 on the deck 14 at the rear of the carriage 12. This is accomplished by aligning the slot 38 in the mounting plate with the bolt means 42 protruding from the deck 14. The bolt means 42 are initially loosely tightened, whereupon the belt 40 is placed around the power take-off pulley 32, given one-half twist, and threaded through the aperture 58 and around the pulley 56 on the edger shaft 46. The edger 34 is then pulled rearwardly with respect to the carriage 12 in order to properly tighten the belt 40, at which time the bolt means 42 are tightened so that the mounting plate 36 is securely positioned on the deck 14 at the rear of the carriage 12.

The internal combustion engine or power source 26 is then started and the edger blade 52 is caused to rotate. It will, of course, be clear that the edger 34 is positioned so that the edger blade 52 is absolutely clear of the ground. The edger 34, and thus the edger blade 52, is lowered, guided, and raised, as desired, from a normally non-edging position, wherein all wheels 20 of the carriage 12 are in contact with the ground 54 and the edger blade 52 is spaced from the soil 54, to an edging position, wherein the edger blade 52 engages the soil 54, by pivoting the carriage 12 on its rear wheels 20. As can be seen from FIG. 2, when edging the sidewalk 66, the lawn mower 10 will move along the surface of the pavement. As hereinbefore explained, the drag shoe 64 and the wedge 68, or the cutting disc 78, aid in the edging process. Additionally, if it is desired to have the edger 34 produce a trough 76 of greater width, an edger blade assembly 52 having a sloping bearing 75 with an aperture 74a therein may be secured to the plate 72 so that the cutting blade 70 is at an angle with the axis of the horizontal edger shaft 46 may be utilized. Accordingly when the plate 72 is secured to the edger shaft 46 the cutting blade 70 is inclined toward the carriage 12.

After the edging operation is complete, the debris, such as soil, grass and the like, which is on the driveway and walks may be chopped up into fine particles and blown onto the grass by passing the lawnmower back and forth over the driveway and walks.

When the cutting blades 70 of the edger blade assembly 52 become dull, the whole assembly may be replaced, or, as shown in FIGS. 6 and 7, new segments 70 may be utilized.

While certain preferred embodiments of the invention have been specifically illustrated and described, it is understood that the invention is not limited thereto, as many variations will be apparent to those skilled in the art, and the invention is to be given its broadest interpretation within the terms of the following claims.

I claim:

1. A lawn mower and edger comprising, in combination, a wheeled carriage having a substantially horizontal deck, a motor having its base supported by and above said deck and having a substantially vertical shaft extending downwardly through said deck, an elongated rotatable blade secured to the lower end of said shaft and arranged to rotate at all times in substantially horizontal plane, a power take-off pulley secured to said shaft at a point between said deck at the rear of said carriage, said mounting plate including a downwardly extending leg portion extending outwardly beyond the rear periphery of said carriage, a substantially horizontal, transversely extending, edger shaft rotatably mounted on said downwardly extending leg portion of said mounting plate, an edger blade assembly provided with at least one cutting blade secured to one end of said edger shaft rearwardly and laterally of said carriage and arranged to rotate at all times, in a substantially vertical plane, clear of the ground when all wheels of said carriage are in contact with the ground and said cutting blade is in a normally non-edging position spaced from the soil, the plane of rotation of said cutting blade being disposed a distance laterally from the side of said carriage so as to clear a rear wheel of said carriage, a pulley secured to the other end of said edger shaft, and belt means connecting said power take-off pulley and said pulley on said edger shaft for driving said edger shaft, said edger shaft, and thus said cutting blade, being lowered, guided and raised, as desired, from a normally non-edging position, wherein said cutting blade is spaced from the soil, to an edging position, wherein said cutting blade engages the soil, while said motor is in operation, by pivoting said carriage on its rear wheels.

2. The lawn mower and edger according to claim 1, wherein said guard shield is provided with a drag shoe at the bottom edger thereof, said drag shoe being substantially contiguous with the surface of the pavement immediately adjacent said cutting blade when said cutting blade is in engagement with the soil.

3. The lawn mower and edger according to claim 2, wherein said shield is provided with a depending wedge which is substantially contiguous with the edge of the pavement adjacent said cutting blade is in engagement with the soil.

4. The lawn mower and edger according to claim 10, wherein a cutting and guide disk is rotatably disposed adjacent said shield and arranged to rotate at all times in a substantially vertical plane, whereby when said cutting blade is in engagement with said soil, said cutting and guide disk rotates against the edge of the adjacent pavement with the cutting edge thereof in the bottom of the trough formed by said cutting blade.

5. The lawn mower and edger according to claim 1, wherein the rear edge of said deck is turned down to provide a vertically disposed flange, said flange being provided with an aperture therein located in a line radially of the center of said deck, and wherein said belt means connecting said power take-off pulley and said edger shaft passes through said aperture.

6. The lawn mower and edger according to claim 1, wherein said edger blade assembly comprises a support plate and a plurality of wedge shaped cutting blades secured on the peripheral edge thereof, said support plate having a central aperture therethrough, said plate being secured through said aperture to said edger shaft.

7. The lawn mower and edger according to claim 5, wherein the aperture through said plate is at an angle with the axis of said horizontal edger shaft, and wherein a sloping bearing is secured therein, said sloping bearing receiving said edger shaft such that when said plate is secured to said edger shaft cutting blade is inclined toward said carriage.

8. The lawn mower and edger according to claim 7, wherein said angle is within the range of 10° to 15°.

9. The lawn mower and edger according to claim 1, wherein said mounting plate is provided with slot means for adjustably securing the former to said deck in a desired position such that said belt means maintains a desired tautness, and wherein bolt means are provided on said deck extending through said slot means.

10. The lawn mower and edger according to claim 1, wherein a sleeve is secured to the edge of the leg portion of said mounting plate, said edger shaft being disposed within said sleeve, wherein bearings are disposed within said sleeve surrounding said edger shaft, and wherein a guard shield is secured on said sleeve to enclose said cutting blade.

* * * * *